2 Sheets—Sheet 1.
H. BATCHELDER.
HEAD BLOCK FOR SAWMILLS.
No. 74,486.        Patented Feb. 18, 1868.
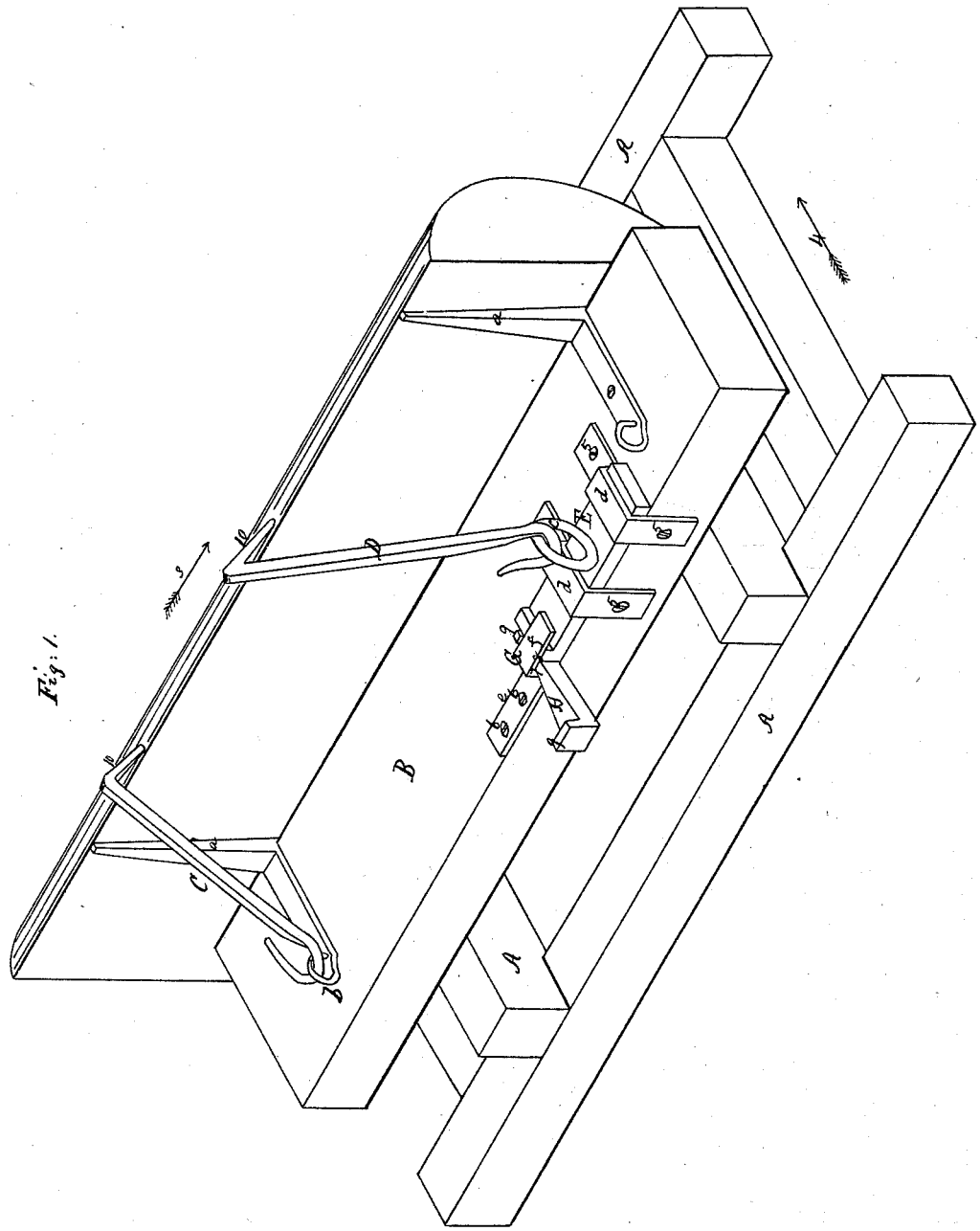
Witnesses
Inventor 2 Sheets—Sheet 2.
H. BATCHELDER.
HEAD BLOCK FOR SAWMILLS.
No. 74,486. Patented Feb. 18, 1868.
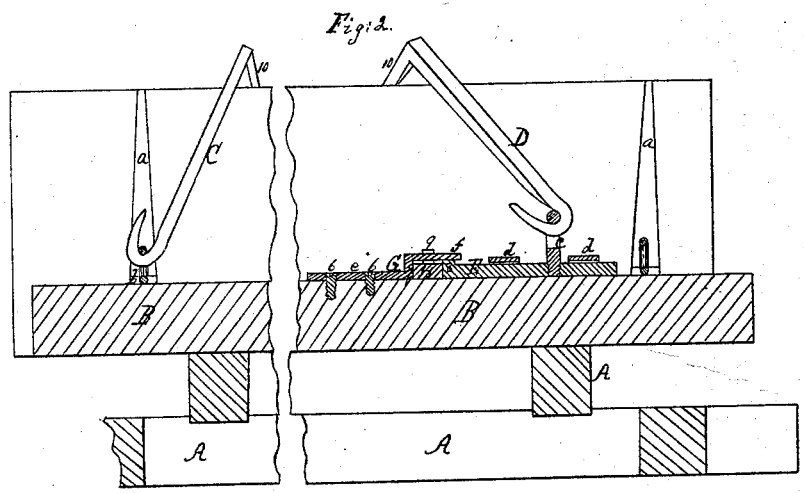
Witnesses-
Inventor-
Herrick Batchelder

UNITED STATES PATENT OFFICE.

HERRICK BATCHELDER, OF READING, MASSACHUSETTS.

IMPROVEMENT IN HEAD-BLOCKS FOR SAW-MILLS.

Specification forming part of Letters Patent No. 74,486, dated February 18, 1868.

*To all whom it may concern:*

Be it known that I, HERRICK BATCHELDER, of Reading, in the county of Middlesex and State of Massachusetts, have invented certain Improvements in Apparatus for Holding Logs in Place While Being Sawed, of which the following is a full, clear, and exact description, reference being had to the accompanying drawings, making part of this specification, in which—

Figure 1 is a perspective view of a carriage for holding logs up to a circular saw with my improvements applied thereto. Fig. 2 is a longitudinal section through the same.

In the ordinary operation of cutting boards from logs where a circular saw is employed after the first half of the log has been cut up it is customary to reverse the position of the remaining half of the log and secure it against the side of the sliding carriage or "set-off" by means of dogs driven into the half-log after it is pressed up against the carriage. As the sawing proceeds the dogs gradually slacken their hold upon the log, and it is canted over from the carriage or set-off out of its vertical position, so that one or more of the last boards cut are not of an uniform thickness throughout.

To obviate this difficulty is the object of my invention, which consists in attaching the inner end of one of the dogs to a block, which is made to slide upon the set-off by means of a wedge, thereby causing the dog to constantly maintain a tight hold on the log and prevent it from canting toward the saw.

To enable others skilled in the art to understand and use my invention, I will proceed to describe the manner in which I have carried it out.

In the drawings, the log to be cut into boards is placed upon a carriage frame or truck, A, which is caused to move longitudinally (in the direction of the arrow 3) toward the saw in a well-known manner.

B is the carriage or "set-off," against the side of which and the vertical guides *a* the log is secured by dogs C D, to be moved a distance equal to the required thickness of the boards laterally toward the saw, as represented by the arrow 4. The inner ends of both of the dogs are bent around, as shown, that C passing through a stationary eye, *b*, forming a part of the lower end of one of the vertical guides *a*, while the inner end of the dog D passes through an eye, *c*, rising from a block, E, which is caused to slide longitudinally between guides *d*, secured at 5 to the set-off, in a manner and for a purpose now to be described.

G is a plate, the lower end, *e*, of which is screwed to the set-off at 6, while its upper end, *f*, is bent over, forming a square shoulder, 7, between which and one end, 8, of the block E is placed a wedge, H, each extremity of which is provided with a projection, 9, to keep it in place under the upper end, *f*, of the plate G, which serves as its guide. After the log has been properly secured upon the truck A and against the vertical guides *a* and side of the carriage B, boards of the required width are sawed from one half of the log in a well-known manner, when the remaining half of the log is turned over so as to bring its flat surface against the guides *a*, as seen in Fig. 1. It is now snugly pressed up by a cant-hook or otherwise, and the claws 10 of the dogs C D are driven into it by a hammer or mall, after which the wedge H is driven in between the shoulder 7 and end 8 of the block E, to the eye *c* of which is secured the inner end of the dog D, the block E being compelled thereby to move longitudinally in the direction of the arrow 3 and cause the dog D to maintain a tight hold upon the half of the log and keep it constantly in snug contact with the side of the set-off and against the vertical guides *a*, in which position the boards are cut of an uniform thickness throughout their length.

The block E may be moved by a screw passing through the plate G instead of by the wedge; but I prefer the use of the latter.

What I claim as my invention, and desire to secure by Letters Patent, is—

1. Securing the inner end of one of the dogs D to a movable block, E, as and for the purpose set forth.

2. The wedge H, in combination with the block E and its dog D, operating substantially as and for the purpose described.

HERRICK BATCHELDER.

Witnesses:
 N. W. STEARNS,
 W. J. CAMBRIDGE.